UNITED STATES PATENT OFFICE.

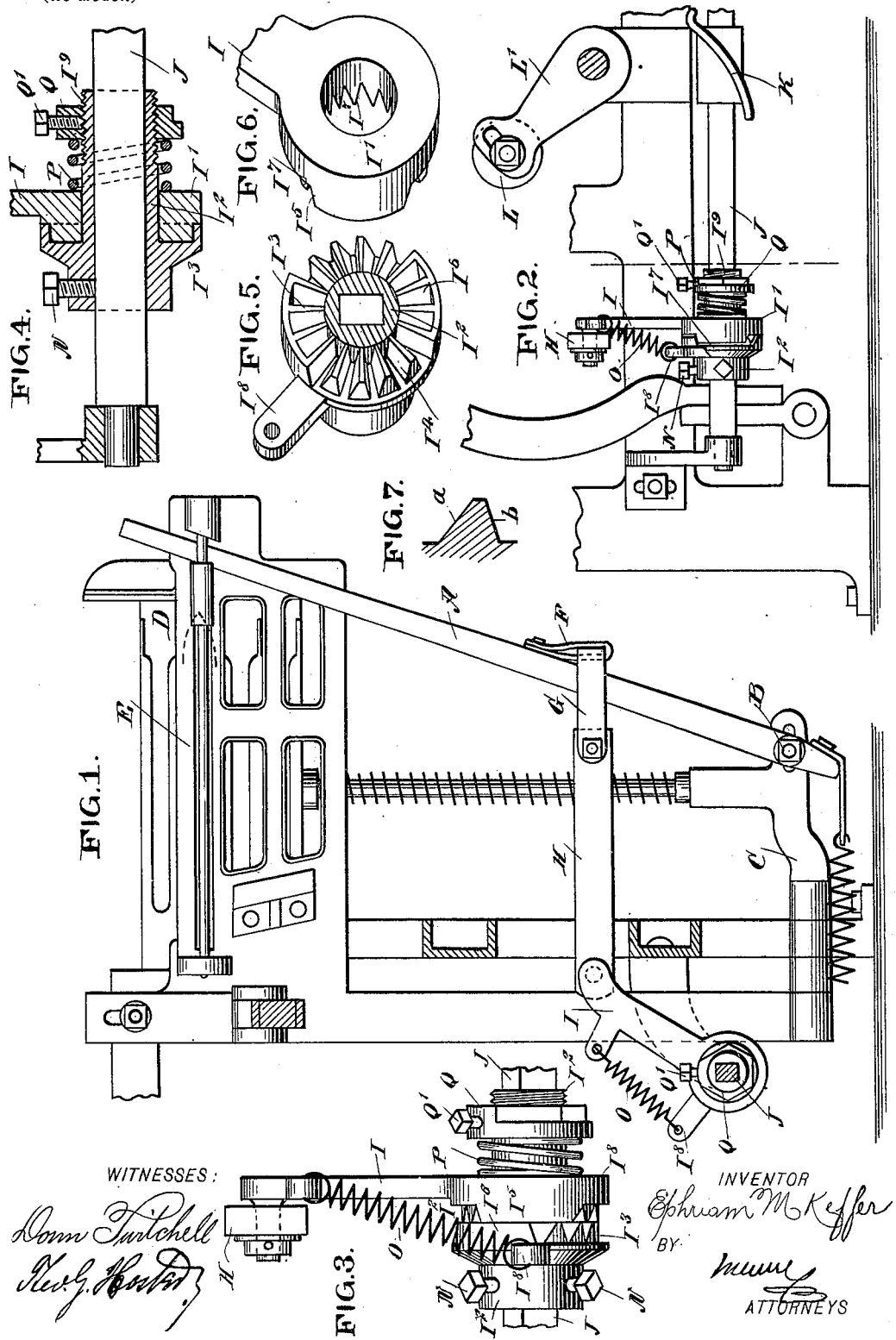

EPHRAIM M. KEFFER, OF HESPELER, CANADA.

PICKER MECHANISM FOR LOOMS.

SPECIFICATION forming part of Letters Patent No. 659,072, dated October 2, 1900.

Application filed December 27, 1899. Serial No. 741,720. (No model.)

*To all whom it may concern:*

Be it known that I, EPHRAIM M. KEFFER, a subject of the Queen of Great Britain, and a resident of Hespeler, in the Province of Ontario and Dominion of Canada, have invented a new and Improved Picker Mechanism for Looms, of which the following is a full, clear, and exact description.

The object of the invention is to provide certain new and useful improvements in the picker mechanism of a loom, whereby the picker-stick and connected parts are prevented from being broken in case the picker-stick is accidentally locked against movement by the shuttle lodging on the top of the picker, and thereby preventing the picker-stick from actuating the picker and throwing the shuttle through the open shed.

The invention consists of novel features and parts and combinations of the same, as will be fully described hereinafter, and then pointed out in the claims.

A practical embodiment of my invention is represented in the accompanying drawings, forming a part of this specification, in which similar characters of reference indicate corresponding parts in all the views.

Figure 1 is a cross-section of part of a loom, showing the improvement applied. Fig. 2 is a side elevation of the same. Fig. 3 is an enlarged side elevation of the improvement. Fig. 4 is a sectional side elevation of the same. Fig. 5 is a sectional perspective view of one of the clutch members for the picker-shaft arm. Fig. 6 is a perspective view of the picker-shaft arm with the other clutch member, and Fig. 7 is an enlarged side elevation of a clutch-tooth.

A picker-stick A, of the usual construction, is mounted to turn at its lower end on a stud B, carried by the usual rocker-arm C, and the upper end of said picker-stick A engages a picker D for throwing a shuttle from the shuttle-box E through an open shed—that is, to the other side of the loom. The picker-stick A is provided between its ends with the usual stirrup F, connected by a strap G with a sweep-stick H, pivotally connected with the free end of a picker-shaft arm I, having its hub I' forming a clutch member mounted to turn loosely on the hub $I^2$ of a clutch member $I^3$, secured on a picker-shaft J, carrying the usual cam K, adapted to be engaged by a friction-roller L on an arm L' to impart the usual rocking motion to the picker-shaft J. The hub $I^2$ has its bore preferably made polygonal to fit the corresponding polygonal shape of the picker-shaft J, and set-screws N engage said hub $I^2$ to secure it in position on the shaft J, so that the clutch member $I^3$ turns with the shaft and is held against longitudinal movement on the shaft.

The clutch member $I^3$ is provided with oppositely-arranged sets of clutch-teeth $I^4$, adapted to engage recesses $I^5$ in the face of the hub I', and the face of the latter is provided with oppositely-arranged sets of clutch-teeth $I^7$, adapted to engage recesses $I^6$ in the face of the clutch member $I^3$. On the clutch member $I^3$ is formed an arm $I^8$, connected by a spring O with the arm I, near the free end thereof, to return the clutch members to a normal locked position after they have been disengaged, as hereinafter more fully described.

On the hub $I^2$, adjacent to the arm I, is coiled a spring P, one end of which presses against the outer face of the hub I', the other end abutting against a collar Q, screwing on the threaded end $I^9$ of the hub $I^2$. Thus by screwing the collar Q farther in or out more or less tension can be given to the spring P to hold the clutch member of the arm I with more or less force in engagement with the clutch member $I^3$, and at the same time the spring P allows the hub I' and the arm I to slide longitudinally on the hub $I^2$ for disengaging the clutch members in case the picker-stick A is locked against movement; but the rocking movement of the shaft J continues. A set-screw Q' serves to lock the collar Q in position on the hub $I^2$ after the collar is adjusted to give the desired tension to the spring P.

When the loom is in operation and the several parts are in a normal position, as illustrated in the drawings, then the rocking motion of the shaft J is transmitted by the clutch member $I^3$ to the clutch member on the arm I, and consequently the latter receives a swinging motion to cause the sweep-stick H, the strap G, and the stirrup F to impart a swinging motion to the picker-stick A and actuate the picker D to send the shuttle from the corresponding shuttle-box through the shed to the shuttle-box on the opposite side of the loom. Now in case the shuttle is accidentally moved on the top of the picker D in the raceway, and thereby locks the said picker, and consequently the picker-stick, then the turning of the shaft I causes the clutch member I³ to move the other clutch out of engagement by sliding the hub I' to the right on the shaft J against the tension of the spring P, so that the picker-stick A is relieved of undue strain, and consequently neither of the parts is liable to be broken, as would be the case if the arm I were not relieved of its swinging motion. It is understood that when the clutch-teeth of the clutch members move out of engagement then the recessed faces I⁶ I⁵ move on top of each other, so that the teeth I⁴ and I⁷ are a sufficient distance away from the faces of the clutch members to allow the clutch member I³ to readily turn with the shaft without danger of breaking any of the teeth or turning the arm I, so that the only strain on the picker-stick A is that given by the spring O on the arm I and transmitted by the latter through the sweep-stick H, strap G, and stirrup F to the picker-stick A.

When the picker-stick A is locked by the shuttle engaging the picker, as described, then the sweep-stick H and the arm I also remain stationary, and when the friction-roller L strikes the cam K then the shaft J and the clutch member I³ are turned, the latter turning in the direction of the taper of its teeth, whereby the other clutch member or hub I' is forced to slide lengthwise on the shaft J against the tension of the spring P, and at the same time the clutch-teeth of the two members move out of mesh and the recessed face portion of one member is brought over the recessed face portion of the other member, so that on a further turning of the clutch member I³ the said face of the recessed member I³ slides on the recessed face of the other member or hub I' to the end of the turning movement (about one-quarter turn) and the arm I does not swing for the time being. When the roller L has left the cam K, the spring O (compressed during the turning movement of the clutch member I³) returns the latter to its former position, and as soon as the recessed faces slide out of contact with each other then a meshing of the clutch members again takes place, owing to the spring P sliding the member I' back on the shaft J. By reference to Figs. 5, 6, and 7 it will be seen that each of the teeth I⁴ I⁵ of the clutch members has the front $a$ and back $b$ slanting at different degrees, so that the clutch-teeth move readily out of mesh when the picker-stick is locked, as above described, and still remain in mesh under ordinary working of the loom for properly transmitting the motion of the shaft J to the picker-stick by the mechanism described.

By the construction described the arm I is completely relieved in case the picker-stick A is held against movement, and consequently there is no danger of any of the parts being broken as long as the shuttle locks the picker D in position in the shuttle-box E. As soon as an attendant of the loom has brought the shuttle into proper position relatively to the picker D then the clutch members again move in engagement with each other at the next quarter-turn of the shaft, as then the strain of the arm I is relieved and the spring P moves the clutch members again in engagement with each other.

Having thus fully described my invention, I claim as new and desire to secure by Letters Patent—

1. A picker mechanism having a relief device for the picker-stick, and comprising a clutch member secured on the picker-shaft and provided on its face with two oppositely-arranged sets of clutch-teeth and two oppositely-arranged projections between the sets of clutch-teeth, the said projections each having a set of recesses, and a picker-shaft arm mounted to turn on the hub of said clutch member and having similarly-arranged sets of clutch-teeth for engagement with the recesses of said clutch member, and similarly-arranged sets of recesses in the face of the hub of said arm and adapted to be engaged by the teeth of the clutch member secured on the picker-shaft, the recessed faces of the clutch members being adapted to slide upon each other, when the teeth of the clutches move out of engagement with the recesses, substantially as described.

2. A picker mechanism having a relief device for the picker-stick and comprising a clutch member secured on the picker-shaft and provided with oppositely-arranged sets of clutch-teeth, and oppositely-arranged sets of recesses in its face, the sets of recesses being located between the sets of clutch-teeth, the said clutch member being provided with an arm, and a picker-shaft arm mounted to turn and to slide and having oppositely-arranged sets of clutch-teeth for engagement with the recesses of said clutch member and oppositely-arranged sets of recesses in the face of the hub of said picker-shaft arm and adapted to be engaged by the teeth of the clutch member secured on the picker-shaft, the recessed faces of the clutch members being adapted to slide upon each other when the clutches move out of mesh, a spring for normally holding the clutch members in engagement, the said spring yielding to allow of disengagement of the clutch members when the picker-stick is locked against movement, and a spring connecting the arm of the clutch member secured to the shaft with the picker-shaft arm, substantially as described.

3. A picker mechanism, comprising a picker-shaft, a picker-shaft arm connected with a picker-stick, a clutch having two members one of which is on the hub of said picker-shaft arm and the other secured to said picker-shaft, the said clutch members being held normally in engagement, but arranged to be disengaged on the rocking of the picker-shaft when the picker-stick is locked against movement, and a spring connecting the clutch member on the picker-shaft with the picker-shaft arm, substantially as shown and described.

4. A picker mechanism, comprising a picker-shaft, a picker-shaft arm connected with a picker-stick, a clutch having two members one of which is on the hub of said picker-shaft arm and the other secured to said picker-shaft, a spring engaging the picker-shaft arm to hold its clutch member normally in engagement with the other clutch member, an arm on the clutch member secured to the picker-shaft, and a spring connecting said arm with the picker-shaft arm, to return the clutch members to normal meshing position after they have been disengaged, substantially as described.

5. A picker mechanism, comprising a picker-shaft, a picker-shaft arm, a sweep-stick pivotally connected at one end with the free end of the picker-shaft arm and at the other end with a strap connected with a picker-stick, a clutch having two members one of which is on the hub of said picker-shaft arm and the other secured to said picker-shaft, the hub of the picker-shaft arm being mounted to turn loosely and having sliding movement to disengage the clutch members when the picker-stick is locked against movement, the rocking of the said picker-shaft, when the picker-stick is locked, imparting said sliding movement to the picker-shaft arm, means for holding the said clutch members normally in engagement, an arm on the clutch member secured to the picker-shaft, and a spring connecting said arm with a projection on the picker-shaft arm, for turning the picker-shaft to return the clutch member secured thereto to the normal meshing position, after the clutch members have been disengaged, substantially as described.

6. A picker mechanism, comprising a picker-shaft, a picker-shaft arm connected with a picker-stick, a clutch having two members one of which is on the hub of said picker-shaft arm and the other secured to the picker-shaft to turn therewith and provided with a hub having a threaded end, said picker-shaft arm being mounted to turn loosely on the hub of the other clutch member and to slide thereon, a coiled spring on the hub of the clutch member secured to the picker-shaft, and pressing against the hub of the picker-shaft arm to normally hold the clutch members in engagement, an adjustable collar on the threaded end of the hub for adjusting the tension of said spring, the teeth of the clutch members having the front and back slanting at different degrees, whereby when the picker is locked against movement, the rocking of the picker-shaft and the clutch member secured thereto, will slide the picker-shaft arm against the tension of the spring and move its clutch member out of mesh, the further turning of said picker-shaft carrying the engaging portion of its clutch member out of meshing position relatively to the other clutch member, and a spring connected at one end with an arm on the clutch member secured to the picker-shaft, and at its other end with the picker-shaft arm near the end thereof to return the clutch member on the picker-shaft to normal meshing position, for the purpose set forth.

In testimony whereof I have signed my name to this specification in the presence of two subscribing witnesses.

EPHRAIM M. KEFFER.

Witnesses:
WELLINGTON KEFFER,
IRA E. SMITH.